US007794837B2

(12) United States Patent
Lippa et al.

(10) Patent No.: US 7,794,837 B2
(45) Date of Patent: Sep. 14, 2010

(54) COVALENTLY IMMOBILIZED FLUORINATED CARBOXYLIC ACID STATIONARY PHASE FOR LIQUID CHROMATOGRAPHY

(75) Inventors: Katrice A. Lippa, Gaithersburg, MD (US); Catherine A. Rimmer, Gaithersburg, MD (US); Lane C. Sander, Gaithersburg, MD (US)

(73) Assignee: The United States of America as represented by the Secretary of Commerce, The National Institute of Standards and Technology, Washington, DC (US)

( * ) Notice: Subject to any disclaimer, the term of this patent is extended or adjusted under 35 U.S.C. 154(b) by 0 days.

(21) Appl. No.: 12/186,728

(22) Filed: Aug. 6, 2008

(65) Prior Publication Data

US 2009/0043042 A1 Feb. 12, 2009

Related U.S. Application Data

(60) Provisional application No. 60/954,138, filed on Aug. 6, 2007.

(51) Int. Cl.
 *B32B 9/04* (2006.01)
(52) U.S. Cl. .................. 428/405; 422/197; 422/225; 422/70; 528/310; 528/39; 524/588; 525/477; 428/403; 428/404
(58) Field of Classification Search ............... 524/588; 525/477; 422/70; 528/310
 See application file for complete search history.

(56) References Cited

U.S. PATENT DOCUMENTS 4,318,819 A * 3/1982 Malloy et al. ............... 252/184

(Continued)

FOREIGN PATENT DOCUMENTS

WO WO 2007/054548 5/2007

OTHER PUBLICATIONS

Lippa et al., Molecular Dynamics Simulations of Alkylsilane Stationary-Phase Order and Disorder. 2. Effects of Temperature and Chain Length, Anal. Chem. 2005, 77, 7862-7871.*

(Continued)

*Primary Examiner*—Vasu Jagannathan
*Assistant Examiner*—Robert C Boyle
(74) *Attorney, Agent, or Firm*—Steve Witters, PLLC; Steve Witters

(57) ABSTRACT

A stationary phase for a liquid chromatograph and process for making is provided. The stationary phase material may have a modified base substrate and a fluorinated carboxylic acid covalently bonded thereto through an amide or ester bond. The stationary phase may have a substantially consistent shape selectivity characteristic with an $\alpha_{TBN/BaP}$ of less than 1 within a temperature range of at least 10-70° C. Advantageously, a fluorinated stationary phase has a shape selectivity characteristic exhibited with an $\alpha_{TBN/BaP}$ of less than 1 with a mobile phase having up to at least 30% water. A process for making the stationary phase involves mixing a substrate material or fluorinated carboxylic acid with a reactive alkylsilane linker and at least one organic solvent to form a first solution. The other of the substrate material or fluorinated carboxylic acid is then added to the first solution, or to a product separated from the first solution, to form a second solution. The second solution is reacted to form the stationary phase.

19 Claims, 9 Drawing Sheets

U.S. PATENT DOCUMENTS

| | | | |
|---|---|---|---|
| 4,830,921 A * | 5/1989 | Kitayama et al. | 428/406 |
| 5,872,198 A | 2/1999 | Mobasch et al. | |
| 5,959,050 A | 9/1999 | Mosbach et al. | |
| 6,169,194 B1 | 1/2001 | Thompson et al. | |
| 6,991,852 B2 | 1/2006 | Carr et al. | |
| 2005/0178730 A1 * | 8/2005 | Li | 210/656 |

OTHER PUBLICATIONS

Kraft et al., Highly Fluorinated Stationary Phases for Analysis of Polyfluorinated Solutes by Reversed-Phase High-Performance Liquid Chromatography, Anal. Chem., 1988, 60, 1969-1972.*

Krafft et al. "Highly Fluorinated Stationary Phases for Analysis of Polyfluorinated Solutes by Reversed-Phase High-Performance Liquid-Chromatography," *Analytical Chemistry* 1988; 60: 1969-1972.

* cited by examiner

Monomeric
Alkylsilane Phase
Polymeric
Alkylsilane Phase
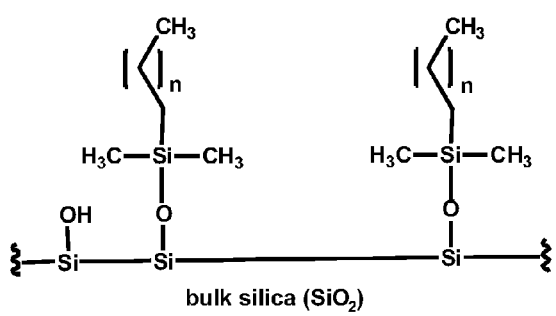
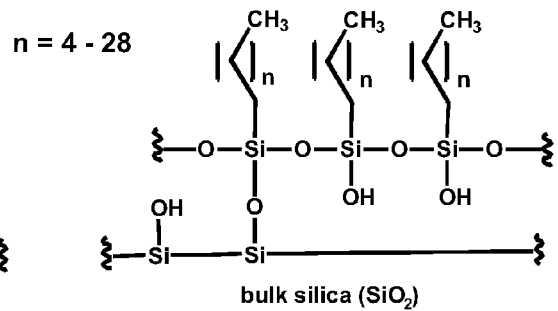
Figure 1A
(Prior Art)
Figure 1B
(Prior Art)

x = 30 - 120
y = 2 - 5

SRM 869a Column Selectivity Test Mixture for Liquid Chromatography

Monomeric $C_{18}$ Phase $\alpha_{TBN/BaP} > 1.7$

Low Shape Selectivity

Polymeric $C_{18}$ Phase $\alpha_{TBN/BaP} < 1$

High Shape Selectivity

Step 1:
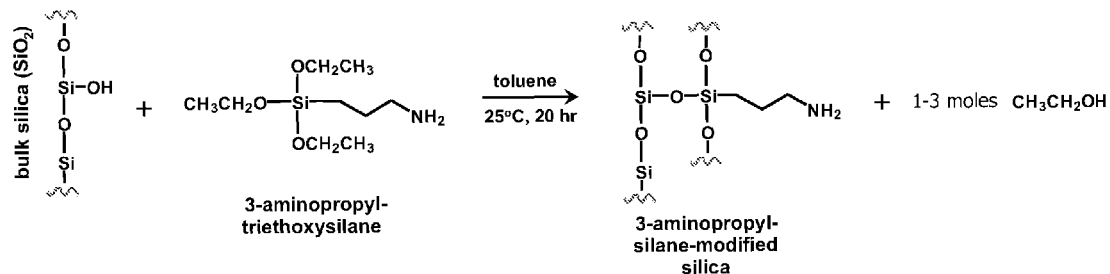
Step 2:
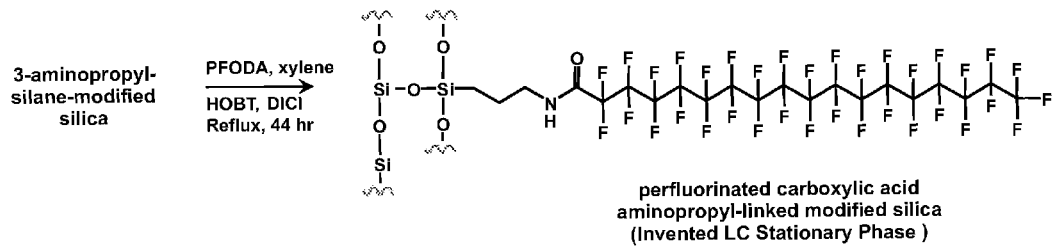
Figure 6

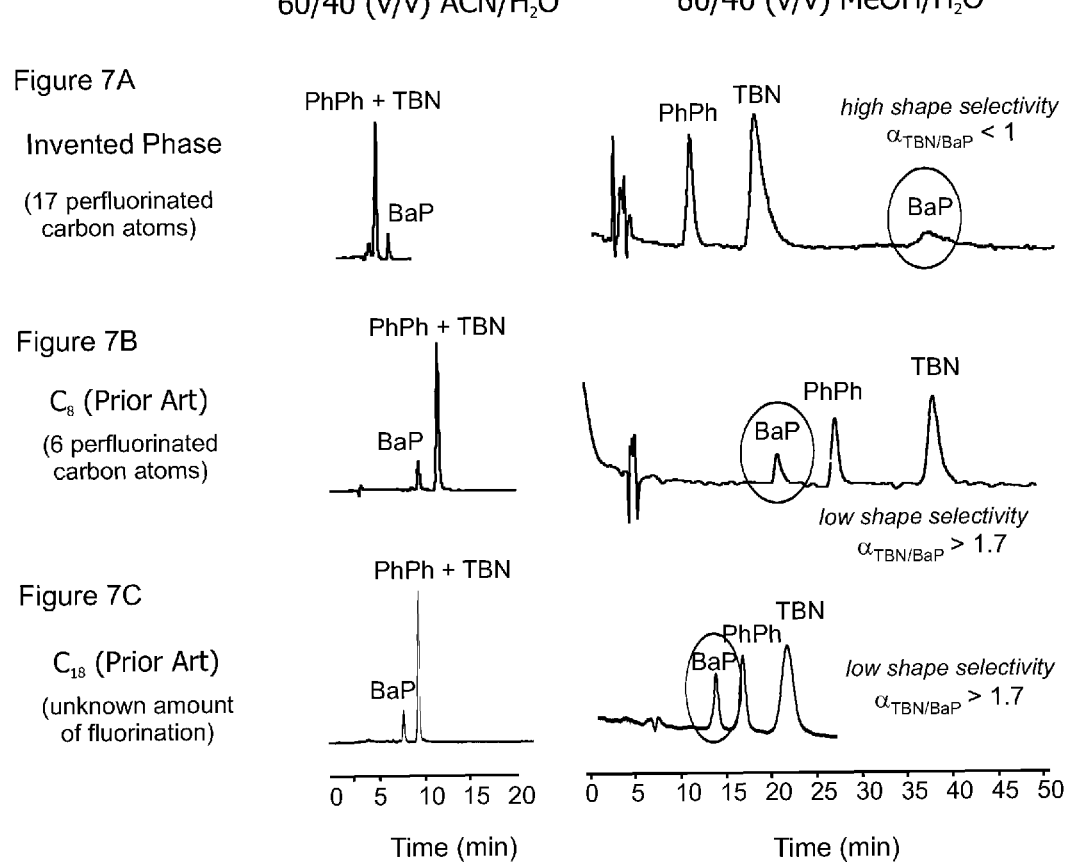

Conventional Alkylsilane
(Polymeric $C_{18}$) Phase
Fluorinated Carboxylic Acid
Aminopropyl-linked Phase
(Invented)
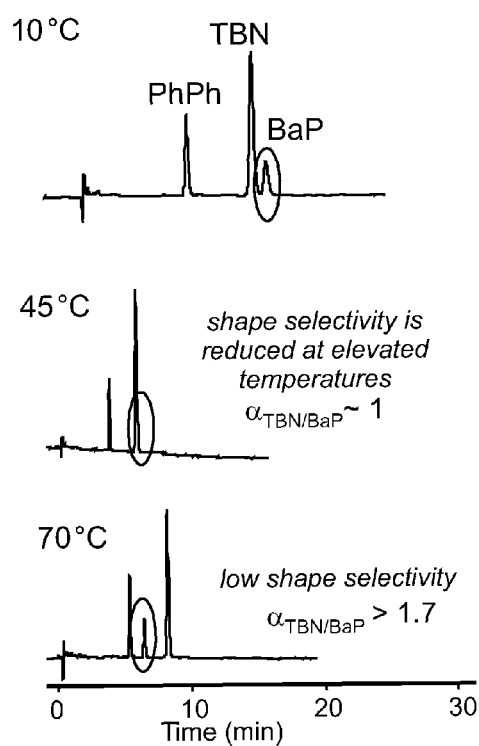
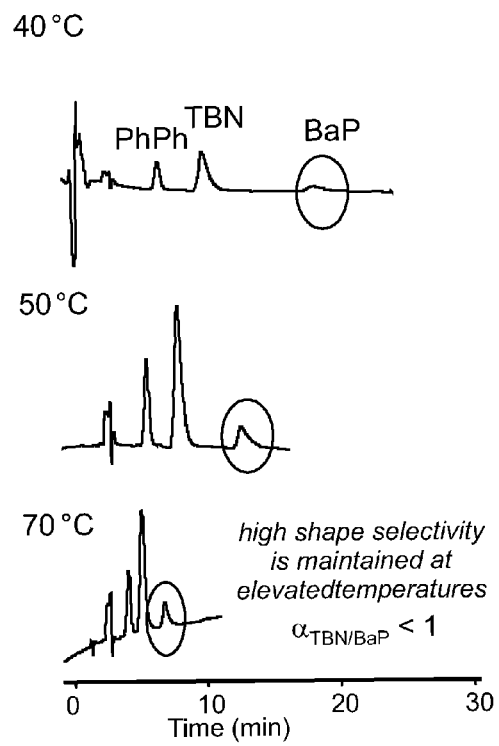
Figure 8A
(Prior Art)
Figure 8B Carboxylic Acid
Aminopropyl-linked Phase
(Hydrocarbon Analog
to Invented Phase)

85/15 (v/v) MeOH/H$_2$O

Fluorinated Carboxylic Acid
Aminopropyl-linked Phase
(Invented)

60/40 (v/v) MeOH/H$_2$O

COVALENTLY IMMOBILIZED FLUORINATED CARBOXYLIC ACID STATIONARY PHASE FOR LIQUID CHROMATOGRAPHY

CROSS-REFERENCE TO RELATED APPLICATIONS

This application claims the benefit of U.S. Provisional Application No. 60/954,138, filed Aug. 6, 2007.

STATEMENT REGARDING FEDERALLY SPONSORED RESEARCH OR DEVELOPMENT

This work is funded by the National Institute of Standards and Technology under the U.S. Department of Commerce.

FIELD OF THE INVENTION

This invention relates to stationary phases for liquid chromatography, and more particularly, to fluorinated stationary phases for improved separation of constituents in the mobile phase and methods of making.

BACKGROUND

It is often desirable to separate constituents in a liquid phase for laboratory analyses, during production, or in the area of bioprocessing. One way to accomplish the separation known in the art is with the use of a liquid chromatograph (LC). A LC has a column with a column-packing material which is commonly referred to as the stationary phase. In reversed phase mode (RPLC), the stationary phase is typically a non-polar material. The eluent, also referred to as the mobile phase, is typically relatively polar and is used to elute the various constituents from the stationary phase. The mobile phase may include, for example, an aqueous solution or a mixture of water and an organic solvent such as an alcohol. Its polarity can be changed by increasing the concentration of the less polar liquid (the alcohol) in the mobile phase, a technique known in the art.

The stationary phase has a solid support material which is typically comprised of synthetic organic polymers and metal oxides such as silica, alumina, titania, zirconia, and hafnia. Silica is the most widely used support for the LC stationary phases. Silane bonding chemistry also allows for a wide variety of stationary phases with different selectivities to be made on a silica support. The most commonly used stationary phases feature a non-polar ligand covalently bound to a porous silica particle through one or more siloxane bonds (Si—O—Si) to render the surface hydrophobic.

A common stationary phase material as is known in the art comprises n-alkyl modified silica RPLC sorbent materials of either monomeric or polymeric linking chemistry as shown in FIGS. 1A and 1B respectively. These stationary materials typically separate the constituents in the mobile phase by mechanisms based on polarity and shape of the constituents. These materials are widely employed for a range of analytical separations, however they may be problematic for the separation of analytes that require a relatively low content of an organic modifier, such as alcohol, in the mobile phase and may not have desired shape separation capabilities.

A process for laboratory use, as is known in the art, comprises injecting a sample solution of constituents into the mobile phase of the assay through an injector port. As the sample solution flows with the mobile phase through the stationary phase, the constituents in the mobile phase solution migrate through the column at varying rates according to the non-covalent interactions of the compounds with the stationary phase. The chemical interactions of the stationary phase and the constituents within the mobile phase determine the rate of migration and separation of the constituents contained in the sample. For example, constituents having stronger interactions with the stationary phase than with the mobile phase elute from the column less quickly, and thus have a longer retention time, and constituents having weaker interactions with the stationary phase than with the mobile phase will elute from the column more quickly, and thus have a shorter retention time.

Columns containing various types of stationary phases are commercially available. However, these stationary phases may not result in the desired separation capabilities of constituents in the mobile phase, especially separation of constituents based on molecular shape recognition. Therefore, what is needed is a stationary phase material having enhanced selectivity, improved molecular recognition and separation of polar and halogenated constituents in highly aqueous solvents.

SUMMARY

In one aspect of the present invention a process for making a stationary phase for a reversed phase liquid chromatograph is provided. The process comprises mixing a substrate material or fluorinated carboxylic acid with a reactive alkylsilane linker and at least one organic solvent to form a first solution. The other of the substrate material or fluorinated carboxylic acid is added to the first solution, or separated product therefrom, to form a second solution. The second solution is reacted to form the stationary phase.

In another aspect of the present invention a stationary phase material for a liquid chromatograph comprises a modified base substrate and a fluorinated carboxylic acid covalently bonded thereto through an amide or ester bond.

In yet another aspect of the present invention, a stationary phase material for a liquid chromatograph is provided having a substantially consistent shape selectivity characteristic with an $\alpha_{TBN/BaP}$ of less than 1 within a temperature range of at least 10-70° C.

In a further aspect, a fluorinated stationary phase material for a liquid chromatograph is provided having shape selectivity characteristics exhibited with an $\alpha_{TBN/BaP}$ of less than 1 with a mobile phase having up to at least 30% water.

BRIEF DESCRIPTIONS OF THE DRAWINGS

The following figures, which are idealized, are not to scale and are intended to be merely illustrative and non-limiting.

FIGS. 1A and 1B show generalized structures of conventional monomeric and polymeric-type alkylsilane-modified silica stationary phases of the prior art.

FIGS. 2A and 2B respectively show an idealized structure of an aminopropyl-linked and a glycidoxypropyl-linked polyethylene-modified silica stationary phase of the prior art.

FIG. 4C shows the chemical structure of the components of SRM 869a.

Figures 5A, 5B, 5C:
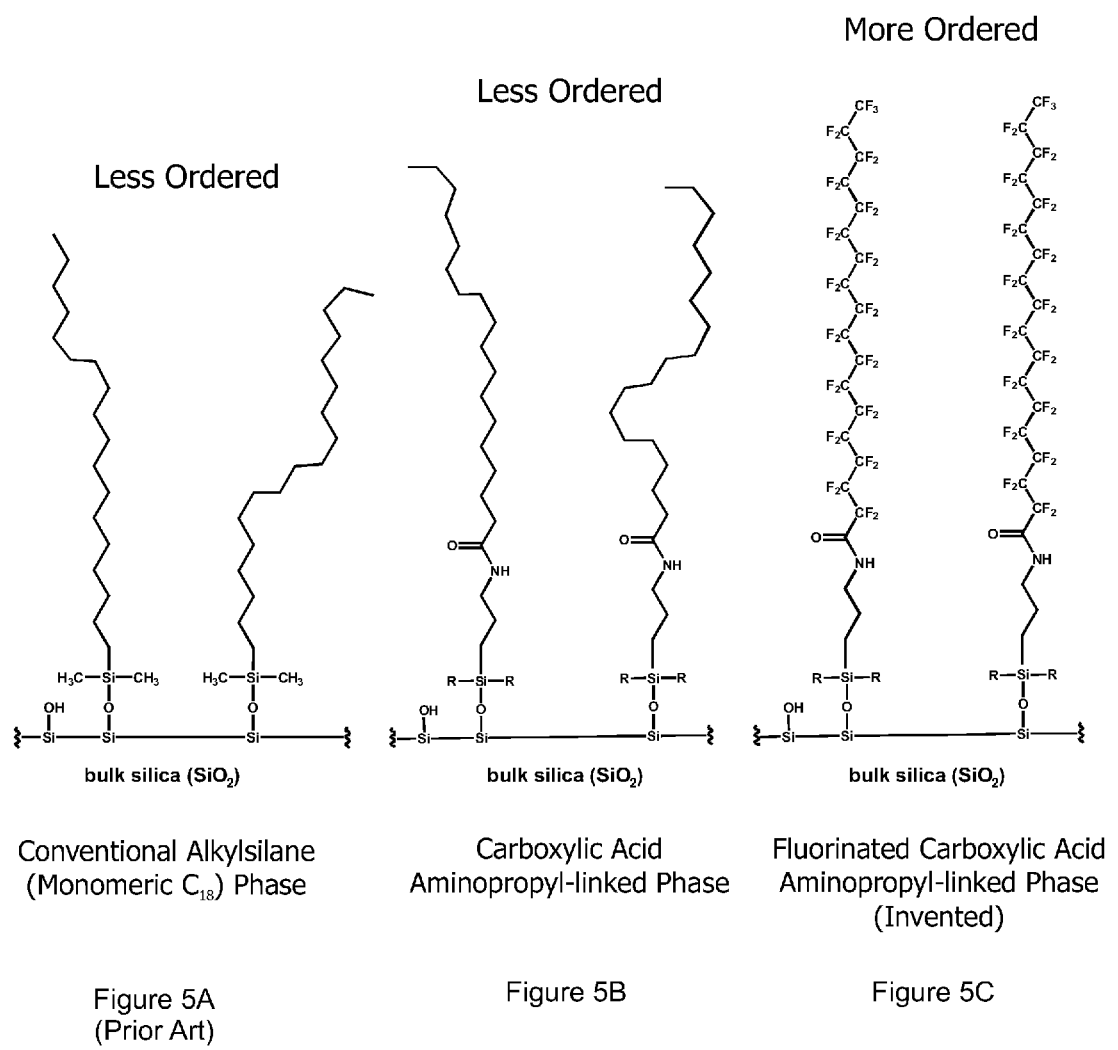

FIGS. 5A, 5B, and 5C schematically show theoretical structural differences between a $C_{18}$ monomeric alkylsilane-modified silica stationary phase of the prior art in FIG. 5A, and a hydrocarbon analog of the carboxylic acid aminopropyl-linked phase of FIG. 5C in FIG. 5B, and an aspect of the present invention having a perfluorinated carboxylic acid aminopropyl-linked phase in FIG. 5C.

FIG. 6 schematic shows an aspect of a process of making the perfluorinated carboxylic acid aminopropyl-linked modified silica-based material shown in FIG. 5C.

FIGS. 7A, 7B, and 7C show chromatograms of SRM 869a in mobile phase conditions of 60/40 (v/v) methanol/water and 60/40 (v/v) acetonitrile/water for a fluorinated carboxylic acid aminopropyl-linked stationary phase of an aspect of the present invention in FIG. 7A, a monomeric fluorinated $C_8$ with six perfluorinated carbon atoms stationary phase of the prior art in FIG. 7B, and a fluorinated $C_{18}$ stationary phase with proprietary bonding chemistry and proprietary degree of fluorination of the prior art in FIG. 7C.

FIGS. 8A and 8B show chromatograms of SRM 869a in a LC having a polymeric $C_{18}$ alkylsilane-modified silica stationary phase of the prior art at both reduced and elevated temperatures and a LC having perfluorinated carboxylic acid aminopropyl-linked modified silica material of an embodiment of the present invention at elevated temperatures.

Figure 9A:
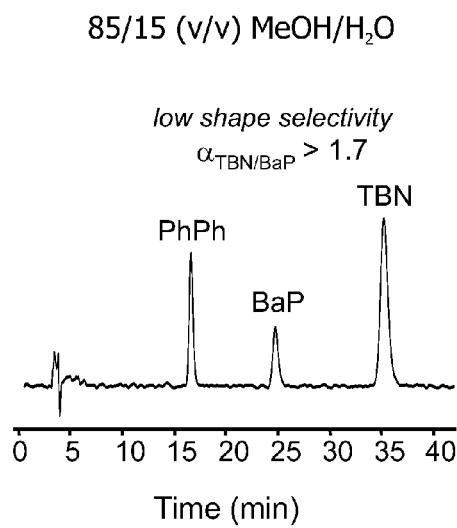
Figure 9B:
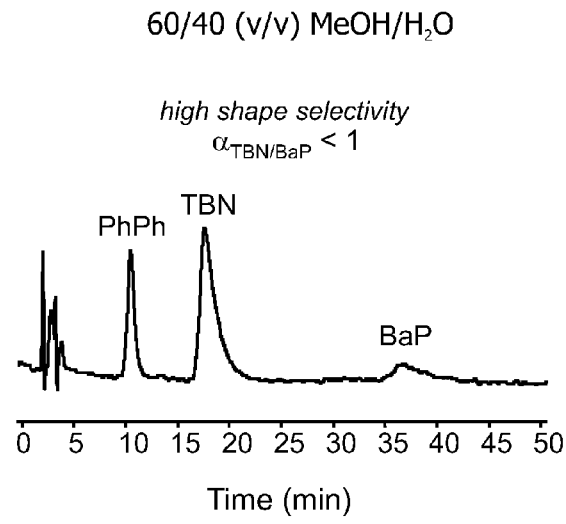

FIGS. 9A and 9B show chromatograms of SRM 869a in a LC having a hydrocarbon analog of the perfluorinated carboxylic acid aminopropyl-linked phase shown in FIG. 5B and a LC having a perfluorinated carboxylic acid aminopropyl-linked modified silica material of an embodiment of the present invention.

DETAILED DESCRIPTION

The present invention is directed to LC stationary phase materials and methods of making. More specifically, this invention is directed toward fluorocarbon-modified stationary phases in LC and methods of making.

In one aspect of the invention, methods for preparing a series of fluorinated stationary phases for reversed-phase liquid chromatographic (RPLC) separations are presented. Silica-based chromatographic materials are chemically modified with fluorinated carboxylic acids to produce a stationary phase material or chromatographic material for an RPLC. These chromatographic sorbents may be synthesized from fluorinated carboxylic acids that range in length (>C6) that are covalently bound to a chromatography-grade silica substrate, which has been modified with amino-functional coupling silane reagents. In another aspect of the invention, the fluorinated carboxylic acid and the aminoalkylsilane are coupled prior to linking to the silica surface. The end result for both methods of preparation is a chromatographic sorbent material that contains an aminoalkyl spacer and a fluorinated alkyl chain connected through an amide linkage.

A range of functionalized silicas may be prepared from various reactive alkylsilane linkers such as 3-aminopropyltriethoxysilane, 3-aminopropylmethyldiethoxysilane, 3-aminopropyldimethylethoxysilane, 3-aminopropyltrimethoxysilane, 3-aminopropylmethyldimethoxysilane, 3-aminopropyldimethylmethoxysilane, 3-aminopropyltrichlorosilane, 3-aminopropylmethyldichlorsilane, 3-aminopropyldimethylchloroxysilane, 4-aminobutyltriethoxysilane, 4-aminobutylmethyldiethoxysilane, 4-aminobutyldimethylethoxysilane, 4-aminobutyltrimethoxysilane, 4-aminobutylmethyldimethoxysilane, 4-aminobutyldimethylmethoxysilane, 4-aminobutyltrichlorosilane, 4-aminobutylmethyldichlorsilane, 4-aminobutyldimethylchloroxysilane, glycidoxy-t-butyldimethylsilane, (3-glycidoxypropyl)bis(trimethylsiloxy)-methylsilane, (3-glycidoxypropyl)dimethylethoxysilane, (3-glycidoxypropyl)methyldiethoxysilane, (3-glycidoxypropyl)methyldimethoxysilane, (3-glycidoxypropyl)triethoxysilane, (3-glycidoxypropyl)trimethoxysilane, or other amino- or epoxide-terminated reactive silanes, and combinations thereof as a substrate for linking the various fluorinated ligands. Other reactive alkylsilane linkers as are known in the art may also be used.

The dissimilar chemical structures of the various amino-functional coupling agents may promote differences in the linking chemistry that result on the silica surface, however the fluorinated alkyl ligand may be linked through an amide bond with each coupling agent. Additionally, various fluorinated chromatographic sorbents may be prepared with a glycidoxy-alkylsilane modified silica substrate. In this aspect of the invention, the fluorinated ligand may be attached via an ether bond to the alkyl-modified silica.

The silica particles or silica-based substrate may be in the form of a particulate silica material (i.e., silica gel), but other chromatographically-relevant base substrates (e.g., alumina-, zirconia-, titania-, hafnia-based) may be used to generate an embodiment of the present invention. Alternative substrates to amorphous silica that may be used as a chromatographic material base substrate may include monolith silica structures and pellicular-type fused core silica particles. A similar approach may be applied to chemical modification of silicon wafers, for which the surface is sufficiently oxidized to provide adequate level of surface silanols (Si—OH) for bonding. Alternatively, capillaries of fused silica such as those used for capillary electrophoresis applications may be modified as described herein. Other substrates that employ silicon-based surfaces, such as lab-on-a-chip technologies, may also employ the alkylsilane-linked fluorinated carboxylic acid chemistry as disclosed herein and be within the scope of the present invention.

A silica-based substrate that may be use to prepare a chromatographic material of an aspect of the present invention may consist of various particle sizes (e.g., 0.5 to 100 µm) with various porosities (e.g. 10 to 100 nm pore sizes). Some of these alternative size materials that may use these fluorinated carboxylic acid ligand as described herein may improve preparation scale separations.

In one aspect of the present invention, stationary phase LC materials are made with the linkage of fluorinated carboxylic acids to silica particles that were functionalized prior with aminoalkylsilane. Additionally, other fluorinated carboxylic acids of variable chain lengths ($C_6$ to $C_{18}$) may be linked to the aminoalkylsilane spacers.

An aminoalkyl spacer and a perfluorinated carboxylic acid chain are connected to a silica substrate via an amide linkage in a two step process as is schematically shown in FIG. 6. The resulting chromatographic sorbent material comprises an aminoalkyl spacer and a perfluorinated carboxylic acid chain connected via an amide linkage.

Stationary phases may be synthesized on chromatographic-grade silica with a two step process as shown in FIG. 6. In this aspect, silica is first functionalized by mixing with 3-aminopropyl-triethoxysilane ($C_9H_{23}NO_3Si$; CAS 919-30-2) and toluene to form a solution. Alternatively, a chlorinated form of alkylsilane may be used. The solution is allowed to sit at room temperature for several hours while occasional agitating. The solution may then be refluxed and the solid phase filtered and washed with organic solvents to yield 3-aminopropyl-silane-modified silica and ethanol. The molar amount (1-3) of ethanol product depends on the extent of how the aminopropyl silane is crosslinked (through Si—O bonds) along the surface and with other neighboring surfaced linked aminopropyl silanes. If the chlorinated form of the alkylsilane is used, then the molar amount of HCl product, rather than ethanol, will also depend on the nature of the bonding reaction. The resulting 3-aminopropyl-silane-modified silica may have an aminoalkylsilane spacer providing a reactive amino moiety to covalently bind with carbonyl group of the perfluorinated carboxylic acid in the second step of the process where 3-aminopropyl-silane-modified silica is bonded with perfluorooctadecanoic acid ($C_{18}HF_{35}O_2$) to form an amide chemical linkage. It is to be understood that other aminoalkylsilanes or glycidoxyalkylsilanes may be used as amino-functional or epoxide-functional coupling agents, and be within the scope of the present invention.

In the second step of the process shown in FIG. 6, a solution of perfluorooctadecanoic acid (PFODA), xylene: N,N-dimethylformamide, hydroxybenzotriazole (HOBT) and diisopropyl carbodiimide (DICI) is prepared and heated. The functionalized silica or 3-aminopropyl-silane-modified silica formed in the first step is then added to the solution and refluxed. The synthesized material is then washed. Bonding between the perfluorinated carboxylic acid and the available aminopropyl moieties of the modified silica is accomplished in this step. The resultant stationary phase comprises perfluorinated carboxylic acid aminopropyl-linked modified silica. As is known in the art, not all of the aminopropyl moieties of the modified silica may be chemical modified with the perfluorinated carboxylic acid. Therefore, the perfluorinated carboxylic acid aminopropyl-linked modified silica may have a portion of unlinked aminopropyl groups together with covalently bound perfluorinated carboxylic acid to the aminopropyl spacer through an amide bond linkage.

In another aspect of the invention the aminoalkyl-modified silica-base material may be formed by reacting a silica-based substrate with an aminoalkylsilane having labile moieties (i.e., ethoxy, methoxy, chloro) and a various alkyl lengths and substitution patterns (i.e., n-propyl, i-propyl, n-butyl, t-butyl). The chromatographic material of an aspect of the present invention can be formed by reacting the various aminoalkyl-modified silica-base materials with a perfluorocarboxylic acid of varying carbon lengths (>C6) to form an amine-linked, extended length fluorinated carboxylic acid stationary phase. The dissimilar chemical structures of the various amino-functional coupling agents may promote differences in the linking chemistry that may result on the silica surface, however the fluorinated carboxylic acid may be consistently linked through an amide bond.

In another aspect of the process of forming a stationary phase material of the present invention, an alkylsilane-modified silica material is prepared by first functionalizing chromatographic-grade silica with 3-aminopropyl-triethoxysilane ($C_9H_{23}NO_3Si$; CAS 919-30-2). This modified-silica is then bonded with a hydrocarbon analog of a perfluorinated material such as octadecanoic acid or stearic acid ($C_{18}H_{36}O_2$; CAS 57-11-4)).

In another aspect, the carboxylic acid may be linked to the silica substrate through a 3-glycidoxypropyltrimethoxysilane-modified silica substrate. For these materials, a fluorinated ligand may be attached via an ether bond to the alkyl-modified silica. A 3-glycidoxypropyltrimethoxysilane modified silica substrate may also be used to chemical bond a fluorinated carboxylic acid but instead through an ester linkage. This glycidoxyalkyl spacer in lieu of the aminoalkyl spacer may have an overall similar chemical effect.

The materials resulting from the process made through the linkage of fluorinated carboxylic acids to silica particles that were functionalized prior with aminoalkylsilane are of a similar class. All chromatographic sorbent materials in this class are designed to contain, as a result, an aminoalkyl spacer and a fluorinated carboxylic acid chain connected via an amide linkage. An alternative synthetic route may involve coupling the carboxylic acid through a 3-glycidoxypropyltrimethoxysilane-modified silica substrate. For these materials, the fluorinated ligand may be attached via an ether bond to the alkyl-modified silica.

Fluorinated stationary phases for liquid chromatographic (LC) separations are provided. These chromatographic sorbents comprise a chromatographic sorbent material that contains an aminoalkyl spacer and a fluorinated alkyl chain connected through an amide linkage. Alternatively, fluorinated chromatographic sorbents produced with a 3-glycidoxypropyltrimethoxysilane modified silica substrate have a fluorinated ligand attached via an ether bond to the alkyl-modified silica.

Perfluoroalkyl (both straight- and branch-chain) and propyl(perfluorophenyl) LC phase materials synthesized through traditional alkylsilane linking chemistry for the separation of relatively low molecular weight (<500 Dalton), polar analytes in a range of polar and aqueous solvents are provided in the prior art. Extended lengths of a perfluoroalkane ligand (i.e. $C_{17}$) that is linked to the aminopropyl-modified silica may increase the extent of its molecular order as shown in FIG. 5C, an aspect of the present invention. Perfluoroalkanes in the solid state exist in a helical conformation for 12 or more carbons and a planar zigzag conformation for 8 or few carbons.

LC stationary phases that have been used in the prior art for shape selective separations include polymeric alkylsilanes of carbon lengths 18-30 as shown in FIG. 1B, monomeric alkylsilanes of extended length ($C_{30}$) as shown in FIG. 1A, and poly(ethylene-co-acrylic acid) phases, either covalently linked to the silica surface with aminopropylsilane or glycidoxypropylsilane spacers as shown in FIG. 2. Aspects of the present invention include silica-based chromatographic materials that have been chemically modified with fluorinated carboxylic acids.

Figure 3:
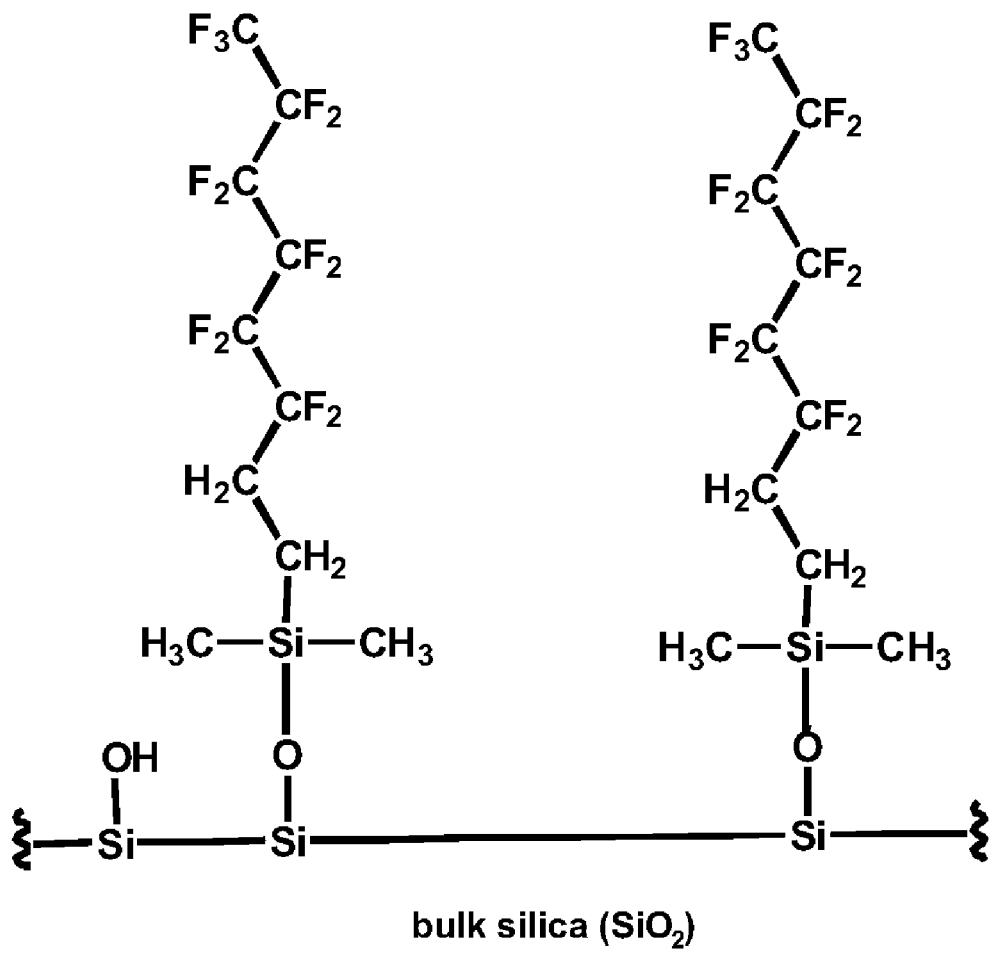
FIG. 3 shows an idealized structure of a perfluorinated $C_6$ chain stationary phase of the prior art.

Aspects of the invented stationary phase can be described as an extended length fluorinated carboxylic acid stationary phase. The overall molecular order of an alkylsilane stationary phase may be generally characterized by the relative amount of trans conformations (or lack of gauche conformations) that are present in its alkyl chains. The extended length fluorinated carboxylic acid stationary phase of an embodiment of the present invention is comprised of long perfluorinated alkyl ligands through an amine covalent linkage. Whereas, RPLC stationary phases of the prior art are comprised of a silica support material modified with a perfluorinated $C_6$ alkylsilane as shown in FIG. 3. These stationary phases of the prior art are typically synthesized through traditional silane chemistry as is known in the art (e.g., Fluophase RP column, Thermo Fisher Scientific). Another fluorinated stationary phase in the prior art is described as a fluoro-aliphatic phase with a proprietary fluoroendcapping (Chromegabond LS column, ES Industries).

An aspect of the present invention formed by the two step process shown in FIG. 6 results in a stationary phase having total of 21 carbons in length, with 17 contiguous perfluorinated carbons and an amide moiety at the δ position from the silica surface-linked silicon atom. As shown in FIGS. 5A-5C, the perfluorinated carboxylic acid aminopropyl-linked phase of an embodiment of the present invention, shown in FIG. 5C, shows the hypothesized structural differences between it and the carboxylic acid (hydrocarbon analog) aminopropyl-linked phase and conventional alkylsilane phases shown in FIGS. 5A and 5B.

A series of covalently immobilized fluorinated carboxylic acid stationary phases for liquid chromatographic (LC) separations that may possess enhanced molecular shape recognition capabilities are hereby presented. This aspect of the invention may provide a liquid chromatographic material that achieves shape selective separations comparable to polymeric $C_{18}$ hydrocarbon alkylsilanes of the prior art for isomeric separations under more aqueous conditions. However, the $C_{18}$ hydrocarbon alkylsilanes of the prior art fail to provide desirable isomeric separations under highly aqueous mobile phase conditions. Yet, the series of covalently immobilized fluorinated carboxylic acid stationary phases presented herein may provide desirable isomeric separations of constituents in a highly aqueous mobile phase.

An aspect of the present invention provides a two-step linking process of significantly fluorinated carboxylic acids to a chromatographic substrate. The substrate may be comprised of any substrate material(s) as are known in the art. For example, the substrate may have silica, titania, alumina, hafnia, zirconia, organic polymeric materials, or combinations of these materials and other materials as are known in the art. The substrate material may be in either a particulate, capillary, or monolithic form and used in packed-bed, capillary or microcolumn, or conventional columns, open tubular capillaries, or in micro/nano-fluidic chip applications. In the two-step linking process provided, a significantly fluorinated carboxylic acid may be coupled with a reactive alkylsilane linker. This coupling may occur in solution prior to addition to the chromatographic substrate or the substrate may be first functionalized with the reactive alkylsilane linker followed by reaction with the fluorinated carboxylic acid.

In another aspect of the invention, a silica-based chromatographic material that has been chemically modified with an extended length ($C_{17}$) perfluorinated carboxylic acid may provide separation of constituents in a mobile phase over a wide range of mobile phase conditions (i.e. methanol/water, acetonitrile/water) and a wide range of operating temperatures (i.e. at least 10 to 70° C.). This aspect of the invention may provide the unexpected result of maintaining continuous shape selective characteristics over a wide range of operating temperatures ((i.e. at least 10 to 70° C.). Such an enhancement in shape recognition capabilities may provide a solid phase material for faster separations and improved efficiencies due to improved diffusion at elevated temperatures without compromising selectivity. The decreased separation time may also allow for increased sample throughput, decreased solvent usage, and the potential for use as preparative scale separations as well as analytical scale separations. The resulting material may provide for improved laboratory and production processes and procedures for the separation of constituents from a liquid phase.

A consistent shape selectivity performance over a wide range of operational temperatures (i.e. at least 10 to 70° C.) and under highly aqueous conditions (i.e. >25% water), or both, may provide a significant advantage over the more limited shape selective performance of the prior art alkylsilane-based chromatographic materials as shown in FIGS. 1A, 1B, 2A and 2B. These prior art alkylsilane-based chromatographic materials typically lose shape recognition capabilities at separation temperatures above 40° C. and for highly aqueous mobile phase conditions (i.e. >25% water). The shorter chain perfluorinated alkylsilane chromatographic materials of the prior art, as shown in FIG. 3, may also be employed for RPLC separations under aqueous mobile phase conditions (>25% water), however, these phases may not be appreciably shape selectivity over the wide range of temperatures. Thus, an aspect of the stationary phase provided herein unexpectedly provides shape selective separations in high aqueous mobile phase conditions over a range of temperatures that extends beyond the typical operational conditions LC separations of the prior art.

Shape selectivity in conventional alkylsilane chromatographic materials of the prior art may be the result of molecularly ordered alkyl chain "slots" or void spaces within the bonded stationary phase for which shape-constrained solutes of differing shapes and sizes can preferentially be selectively retained. The overall molecular order of alkylsilane stationary phase can be characterized by the relative amount of trans dihedral conformations (or lack of gauche conformations) in its alkyl chains. Chromatographically-relevant factors that may promote molecular order in alkylsilane phases may include increased chain length, increased surface coverage and reduced operating temperatures. Alkylsilane stationary phases that possess high levels of molecular order may be uniquely employed for the separations of shape-constrained solutes that tend to exist in various isomeric forms (i.e., varying molecular shape) but are otherwise chemically or physically very similar. Examples of such shape-constrained solutes include the polycyclic aromatic hydrocarbons (PAHs), carotenoids, polychlorinated biphenyls (PCBs) and steroids.

Figure 4A:
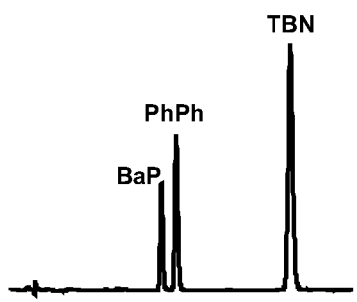
FIGS. 4A and 4B show chromatograms of a Standard Reference Material (SRM) 869a Column Selectivity Test Mixture for Liquid Chromatography on a monomeric $C_{18}$ and a polymeric $C_{18}$ stationary phase showing the shape selective differences between these two chromatographic materials of the prior art.
Figure 4B:
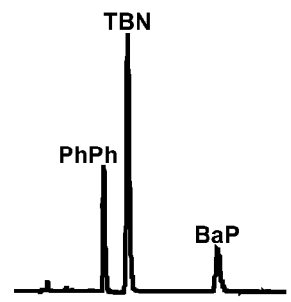
Figure 4C:
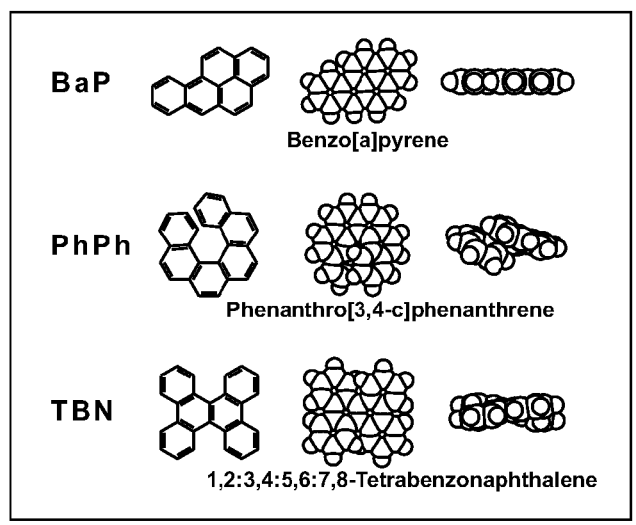

The ability for a stationary phase material to provide shape-selective separations is commonly tested using chromatographic test mixtures that contain a series of solutes that vary in molecular shape but are otherwise chemically and/or physically very similar. Standard Reference Material 869a Column Selectivity Test Mixture for Liquid Chromatography (SRM 869a) was employed to characterize an aspect of the present invention. SRM 869a is a mixture of three polycyclic aromatic hydrocarbons (PAHs) in acetonitrile: dibenzo[g,p]chrysene (alternate name, tetrabenzonaphthalene, TBN, MW=328) benzo[α]pyrene (BaP, MW=252) and phenanthro[3,4-c]phenanthrene (PhPh, MW=328). Molecular representations of the solutes of SRM 869a are shown in FIG. 4C and separation on shape selective and non-shape selective phases are shown in FIGS. 4A and 4B.

The shape selectivity ($\alpha_{TBN/BaP}$) of a phase is defined as:

$$\alpha_{TBN/BaP} = k'_{TBN}/k'_{BaP}$$

where k' is the retention factor of a given analyte. The retention factor is determined by the following equation:

$$k' = (t_r - t_0)/t_0$$

where $t_r$ is the retention time of the solute of interest (in minutes) and $t_0$ is the time it takes an unretained solute to elute. The elution order ratio (k') for the nonplanar (TBN) and planar (BaP) solutes (i.e., $\alpha_{TBN/BaP} = k'_{TBN}/k'_{BaP}$) therefore provides a numerical assessment of the phase's shape selectivity. A selectivity factor of $\alpha_{TBN/BaP} > 1.7$ is indicative of a stationary phase with low shape selectivity, for which the planar solute, BaP, elutes before the non-planar solute TBN as shown in FIG. 4A. Values of $\alpha_{TBN/BaP}$ between 1.0 and 1.7 are considered "intermediate". Values of $\alpha_{TBN/BaP}$ below 1.0 are indicative of a stationary phase with increased molecular shape recognition characteristics and are deemed "shape-selective", in which the planar molecule, BaP, is more retained and elutes after TBN as shown in FIG. 4B. Thus, the shape selectivity factor $\alpha_{TBN/BaP}$ is used as a single measure to predict how a particular reversed-phase liquid chromatographic material will separate isomer mixtures and solutes with constrained molecular shape.

Figure 2A:
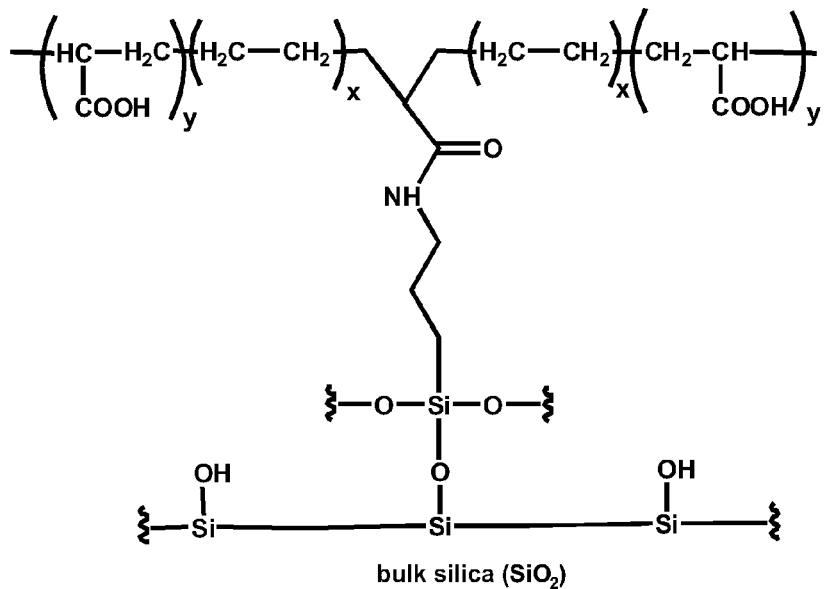
Figure 2B:
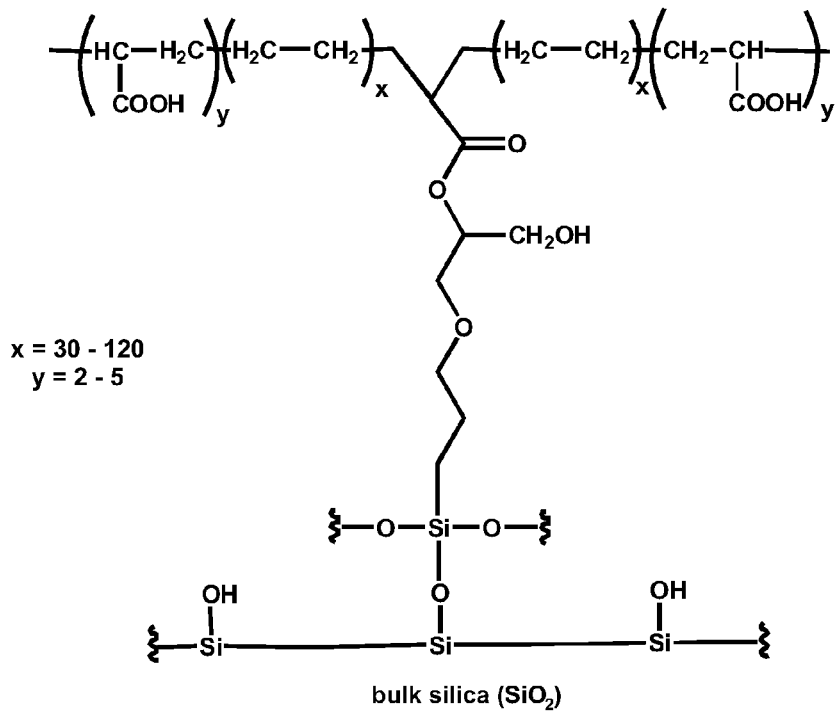

Typical LC stationary phases of the prior art that have been used for shape selective separations include polymeric alkylsilanes of carbon lengths 18-30 as shown in FIG. 1B, monomeric alkylsilanes of extended length ($C_{30}$) as shown in FIG. 1A, and poly(ethylene-co-acrylic acid) phases, either covalently linked to the silica surface with aminopropylsilane or glycidoxypropylsilane spacers as shown in FIGS. 2A and 2B respectively. The shape recognition capacities for such phases, however, are generally restricted to more moderate operating conditions, such as a relatively low percentage of aqueous content in the mobile phase (i.e. <25%) and at lower operating temperatures (i.e. <40° C.).

An aspect of the stationary phase provided herein may be described as an extended length fluorinated carboxylic acid stationary phase with molecular shape recognition for liquid chromatographic (LC) separations at high temperatures and/or highly aqueous mobile phase conditions. The extended length fluorinated carboxylic acid stationary phase of an aspect of the present invention is comprised of longer perfluorinated alkyl ligands than that of the prior art. The perfluorinated alkyl ligands of an aspect of the present invention may be bound to the substrate through an amine covalent linkage, and as a result be more shape selective as defined by SRM 869a. This comparison of shape selectivity is shown in FIGS. 7A-7C wherein FIG. 7A shows shape selective characteristics of an aspect of the present invention and FIGS. 7B and 7C show shape selective characteristics of stationary phases of the prior art. The prior art RPLC phases have a silica support material modified with a perfluorinated $C_6$ chain as shown in FIG. 3, and are typically synthesized through traditional silane chemistry (e.g., Fluophase RP column, Thermo Fisher Scientific). Another of a fluorinated stationary phase of the prior art may be described as a fluoro-aliphatic phase with a proprietary fluoroendcapping (Chromegabond LS column, ES Industries).

Through the chromatographic evaluations of two prior art stationary phases using SRM 869a, it has been shown that these phases of the prior art do not exhibit significant shape selective properties. This is shown in FIGS. 7B and 7C. In addition, a series of perfluorinated $C_6$ alkylsilane modified silica stationary phases comparable to the Fluophase RP as depicted in FIG. 3 were prepared. These three materials were synthesized by reacting chromatographic grade silica with a 1) tridecafluoro-1,1,2,2-tetrahydrooctyl)-1-dimethylchlorosilane (monomeric-type), 2) tridecafluoro-1,1,2,2-tetrahydrooctyl)-1-trichlorosilane (polymeric-type) and 3) a tridecafluoro-1,1,2,2-tetrahydrooctyl)-1-trichlorosilane via a self-assembled monolayer approach. The shape selective chromatographic evaluation of these three resultant materials indicated low shape selectivity for comparable chromatographic conditions as shown in FIG. 7.

FIG. 5A shows a theoretical schematic of a conventional monomeric alkylsilane phase of the prior art. FIG. 5C shows a theoretical schematic of an aspect of the present invention having a perfluorinated carboxylic acid aminopropyl-linked phase. FIG. 5B shows a theoretical schematic structural of a hydrocarbon analog of the carboxylic acid aminopropyl-linked phase of FIG. 5C. The degree of alkyl ligand order may be related to the ability of a chromatographic sorbent to separate solutes based on molecular shape. Low density monomeric $C_{18}$ materials as shown in FIG. 5A are shown to have low shape recognition characteristics under routine operating temperature conditions. These materials may have a plurality of gauche kinks and bends, thus a significant degree of disorder. The amino-linked perfluoroctadecanoic acid shown in FIG. 5C may have a significantly more ordered phase at the same density as the hydrocarbon phases of FIG. 5B. A higher degree of molecular order of the perfluorinated carboxylic acid aminopropyl-linked phase shown in FIG. 5C may play a role in enhancing shape recognition capabilities, as shown in the chromatographic shape recognition tests of the examples.

The effect of mobile phase solvent on three different fluorinated phases is demonstrated in FIGS. 7A-C. The phases are significantly different as the first is a prior art monomeric fluorinated $C_8$ phase with six perfluorinated carbon atoms shown in FIG. 7B. The second is a prior art fluorinated $C_{18}$ phase with proprietary bonding chemistry and proprietary degree of fluorination, shown in FIG. 7C. The third phase is an aspect of the present invention having perfluoroctadecanoic acid linked to an aminoalkylsilane-modified silica substrate. All three phases show distinct differences between acetonitrile (ACN) and methanol (MeOH) as an organic modifier for the mobile phase conditions examined. When acetonitrile is used as the organic component of the mobile phase, the two non-planar molecules, PhPh and TBN, co-elute, whereas methanol separates all three of the PAHs, BaP, PhPh and TBN. The choice of organic modifier (acetonitrile vs. methanol) for the separation of SRM 869a on a hydrocarbon phase does not make a dramatic difference in the separation. This is contrasted with the significant differences shown for the immobilized perfluorinated carboxylic acid phase of an aspect of the present invention. Neither prior art stationary phase, fluorinated $C_8$ nor fluorinated $C_{18}$, were shape selective for either acetonitrile or methanol as organic modifier components. This is contrasted with the immobilized perfluorinated carboxylic acid phase of an aspect of the present invention which was shape selective ($\alpha_{TBN/BaP}<1$) under all investigated conditions.

FIGS. 8A and 8B show the effect of temperature on the separation of SRM 869a on a polymeric $C_{18}$ phase and an immobilized perfluorinated carboxylic acid phase of an aspect of the present invention. Typically, polymeric $C_{18}$ alkyl ligand phases of the prior art are shape selective at ambient temperatures (20-25° C.). For reduced temperatures (10° C.), the phase shows an increase in shape selectivity due to increased alkyl chain ligand order. As the temperature is increased (45° C.), molecular disorder within the alkyl chains may be increased which may result in a loss of shape recognition characteristics. Thus, at a temperature of 10° C. the hydrocarbon phase of the prior art is shape selective, at 45° C. it behaves as an intermediate phase, and at 70° C. there is no evidence of shape selectivity as shown in FIG. 8A. In contrast, the immobilized perfluorinated carboxylic acid phase of an aspect of the present invention shows decreased retention with increasing temperature; however the shape selectivity remains roughly the same up to a temperature of 70° C. This substantially consistent shape selectivity through the temperature range is shown in FIG. 8B. The perfluorinated alkane sorbent material of an aspect of the present invention may maintain a significant level of molecular order at higher temperatures thus providing an additional operational advantage over prior art alkylsilane chromatographic materials that are not a molecularly rigid at such temperatures. The chromatographic material of an aspect of the present invention therefore may be particularly useful for employment in shape selective separations that require more extreme operating conditions (i.e., elevated temperatures, highly aqueous mobile phases).

A perfluorinated carboxylic acid aminopropyl-linked phase of an aspect of the present invention was characterized as maintaining a substantially consistent shape selectivity capability up to an operating temperature of about 70° C. However, the perfluorinated carboxylic acid aminopropyl-linked phase may exhibit a substantially consistent shape selectivity capability at even higher separation temperatures. Those skilled in the art of LC separations will recognize that controlling the temperature using routine LC equipment that employ water-based circulating baths is limited. The chromatographic material of an aspect of the present invention may be employed in an apparatus that may accommodate and appropriately modulate higher operating temperatures. Thus, the performance characteristics of an aspect of the present invention at an operating temperature of 70° C. is not to be considered a maximum operating temperature.

The perfluorinated carboxylic acid aminopropyl-linked phase of an aspect of the present invention was shown to be stable enough to provide reliable retention and selectivity over the time period to complete the separation at the operating temperature of 70° C. as shown in FIG. 8B. For the prior art alkylsilane $C_{18}$ phase, shape recognition is lost at separation temperatures above 40° C. as shown in FIG. 8A. In addition, the prior art alkylsilane silica-based LC columns are also vulnerable to deterioration at elevated temperatures (>70° C.) as evinced by a loss of solute retentive capacity. However, the perfluorinated phase as described in an aspect of the present invention appears to be resilient under the operating conditions as described in FIG. 8B.

In another aspect of the present invention, an alkylsilane-modified silica material is prepared by first functionalizing chromatographic-grade silica (5 μm, 20 nm pores) with 3-aminopropyl-triethoxysilane ($C_9H_{23}NO_3Si$; CAS 919-30-2). This modified-silica is then bonded with hydrocarbon analog of the perfluorinated material of an aspect of the present invention (octadecanoic acid or commonly known as stearic acid ($C_{18}H_{36}O_2$; CAS 57-11-4)). The resultant carboxylic acid stationary phase is chemical analogous to the perfluorinated material of an aspect of the present invention shown in FIG. 5C with similar amide chemical linkage to the aminoalkylsilane-modified silica-base material, shown in FIG. 5B. The resultant stationary phase is a total of 21 carbons in length and contains an amide moiety at the δ position from the silica surface-linked silicon atom. The hydrocarbon analog, shown in FIG. 5B, of the aspect of the invented phase, shown in FIG. 5C, is not appreciably shape selective (as defined by Standard Reference Material 869a). This is shown in FIGS. 9A and 9B. Thus, the contiguous segment of 17 perfluorinated carbons of an aspect of the present invented stationary phase shown in FIG. 5C may be responsible for the enhance shape selectivity that is shown for this aspect of the present invention in FIG. 9B.

The separation of SRM 869a on the hydrocarbon analog (stearic acid) as compared to an aspect of the present invention is also shown in FIG. 9 which illustrates the solvent effect differences between the two materials. The necessary mobile phase composition for the two separations are quite different as the solutes are infinitely retained on the hydrocarbon phase at 60/40 methanol/water and essentially unretained on the fluorinated phase at 85/15 methanol/water. Optimum mobile phase conditions for each phase are shown in FIGS. 9A and 9B and the separation temperature is 25° C. for both phases. FIG. 9B shows the immobilized perfluorinated carboxylic acid phase has high shape selectivity under more aqueous conditions (40% water) whereas the immobilized hydrocarbon carboxylic acid phase can only perform a separation (albeit with low shape recognition) under more organic mobile phase conditions (15% water) as shown in FIG. 9A.

EXAMPLES

Objects and advantages of this invention are further illustrated by the following examples, but the particular materials and amounts thereof recited in these examples, as well as other conditions and details, should not be construed to unduly limit this invention. Solvents for synthesis and chromatography were purchased from a number of sources: acetone, acetonitrile, methanol, pentane, water, and xylene were obtained from J.T. Baker (Phillipsburg, N.J., USA), toluene was obtained from Burdick and Jackson (Morristown, N.J.), isopropanol was obtained from The Warner Graham Co. (Cockeysville, Md., USA) and N,N-dimethylformamide was obtained from Sigma-Aldrich (Milwaukee, Wis., USA). Octadecanoic acid, hydroxybenzotriazole (HOBT), and diisopropyl carbodiimide (DICI) were obtained from Sigma-Aldrich (Milwaukee, Wis., USA). Perfluorooctadecanoic acid was purchased from (Exfluor, Round Rock, Tex., USA) and 2-propylaminotriethoxy silane and (tridecafluoro-1,1,2,2-tetrahydrooctyl)trimethoxysilane was obtained from Gelest (Morrisville, Pa.).

Example 1

Stationary phases were synthesized on chromatographic-grade silica, Viking™ silica, 5 μm 200 Å, lot 07D107HTA, manufactured by Restek of Bellefonte, Pa., with a two step process. The pore diameter, pore volume, surface area and particle size of the chromatographic-grade silica was, 186 Å, 0.82 cm³/g, 149.1 m²/g and 4.92 μm, respectively, as reported by the manufacturer. First, about 4.05 g. the Viking™ silica was functionalized by mixing with about 2.2 ml of 3-aminopropyl-triethoxysilane ($C_9H_{23}NO_3Si$; CAS 919-30-2) and about 20 ml of toluene to form a solution. The solution was allowed to sit at room temperature, about 25° C., for about 12 hrs and was occasional agitated. The solution was then refluxed for about 1 hr. The solid phase was filtered hot, and washed with about two 50 ml portions each of hot toluene, acetone, and pentane. The solid phase comprising aminopropyl-modified silica was then stored dry for use in the second step of the process.

In the second step, about 1.63 g of perfluorooctadecanoic acid (PFODA) was dissolved in hot 50:50 xylene: N,N-dimethylformamide. To this solution, about 0.09 g of hydroxybenzotriazole (HOBT) and about 1 ml of diisopropyl carbodiimide (DICI) were added. The solution turned to a yellow color upon heating. The solution became cloudy and yellow-orange in color when cooled slightly. The aminopropyl-modified silica of the first step was then added to PFODA/HOBT/DICI solution and was refluxed for about 44 hrs. During reflux, the solution began as a yellow-orange color and transformed to a reddish-brown color. The synthesized material was then washed sequentially with two about 50 ml aliquots of each of hot 50/50 xylene/DMF, acetone, methanol, 50/50 methanol water, acetone, and pentane, on a medium porosity glass fitted funnel. The resultant stationary phase comprising perfluorooctadecanoic acid aminopropyl-linked modified silica was stored under isopropanol.

In Examples 2-4, the separation capabilities of the perfluorinated carboxylic acid aminopropyl-linked modified silica stationary phase of Example 1 was compared with commercially available stationary phases of the prior art. Each stationary phase tested was individually slurried in isopropanol and sonicated for approximately 2 minutes (until suspended)

prior to packing. Each stationary phase was then packed into an individual 12.5×4.6 millimeter stainless steel column with compression endfittings. Each column was packed by a downward slurry technique at a packing pressure of about 69 MPa (about 10,000 psi) using isopropanol as a driving solvent.

Several chromatographic systems were used for the evaluation of the stationary phases including both high pressure and low pressure mixing pumps and manual and auto injectors. In each system, column temperature was controlled at various temperatures using an insulator jacket connected to a circulating water bath. All data was collected from variable ultraviolet/visible (UV/Vis) variable wavelength absorbance detectors set to 254 nm.

A chromatographic test mixture (SRM 869a Column Selectivity Test Mixture for Liquid Chromatography) for the evaluation of shape selectivity characteristics of the stationary phases was obtained from the Standard Reference Material Program (NIST, Gaithersburg, Md.). Standard Reference Material 869a is a test mixture commonly employed for the determination of the shape selective characteristics of stationary phases. The mixture contains three polycyclic aromatic hydrocarbons (PAH) in acetonitrile benzo[a]pyrene (BaP), phenanthro[3,4-c]phenanthrene (PhPh), and 1,2:3,4:5,6:7,8-tetrabenzonaphthalene (TBN).

Example 2

The effect of the mobile phase solvent on three different fluorinated stationary phases was tested in a liquid chromatograph. Six separate chromatograms of SRM 869a were tested to show the shape selectivity of the fluorinated carboxylic acid aminopropyl-linked phase of an embodiment of the present invention as compared to the shape selectivity of two fluorinated alkane silica-based materials of the prior art. Mobile phase conditions of 60/40 (v/v) acetonitrile (ACN)/water and 60/40 (v/v) methanol/water were used as the solvent in the mobile phase. The temperature was maintained over a range of 10 to 70° C. and the flow rate through the column was about 1.0 ml/min. Approximately 1-25 µm of SRM 869a was injected into the mobile phase through an injector port. As the SRM 869a in the mobile solution flowed through the stationary phases, the SRM 869a constituents in the mobile phase solution migrated through the column at varying rates. The results are shown in FIGS. 7A, 7B, and 7C wherein the detector response of the constituents of the SRM 869a are plotted versus time in minutes.

FIG. 7A shows the detector response vs. time results of a stationary phase of an aspect of the present invention having perfluoroctadecanoic acid linked to the aminoalkylsilane-modified silica surface, 17 perfluorinated carbon atoms, with mobile phases of 60/40 (v/v) ACN/water and 60/40 (v/v) methanol/water. FIG. 7B shows the detector response vs. time results of a stationary phase of the prior art having monomeric fluorinated $C_8$ with six perfluorinated carbon atoms with mobile phases of 60/40 (v/v) ACN/water and 60/40 (v/v) methanol/water. FIG. 7C shows the detector response vs. time results of a stationary phase of the prior art having fluorinated $C_{18}$ phase with proprietary bonding chemistry and proprietary degree of fluorination with mobile phases of 60/40 (v/v) ACN/water and 60/40 (v/v) methanol/water.

All three stationary phases show distinct differences between ACN and methanol as an organic modifier for the mobile phase conditions. When ACN is used as the organic component of the mobile phase, the two non-planar molecules, PhPh and TBN, co-elute, whereas methanol separates all three of the PAHs, BaP, PhPh and TBN. Neither the commercially available fluorinated $C_8$ (FIG. 7B) nor the commercially available fluorinated $C_{18}$ (FIG. 7C) of the prior art were shown to be shape selective (both exhibiting $\alpha_{TBN/BaP} > 1.7$) in either ACN or methanol as an organic modifier component, whereas the immobilized perfluorinated carboxylic acid phase, an aspect of the present invention, was shown to be shape selective ($\alpha_{TBN/BaP} < 1$) under each investigated condition as shown in FIG. 7A.

Example 3

The effect of temperature on two different stationary phases was tested in a liquid chromatograph. Six separate chromatograms of SRM 869a were tested to show the shape selectivity of the fluorinated carboxylic acid aminopropyl-linked phase of an aspect of the present invention as compared to the shape selectivity of fluorinated $C_{18}$ stationary phase with proprietary bonding chemistry and proprietary degree of fluorination as a function of temperature. The mobile phase comprised 60/40 (v/v) MeOH/$H_2O$ for the fluorinated carboxylic acid aminopropyl-linked stationary phase and is 85/15 (v/v) MeOH/$H_2O$ for the fluorinated $C_{18}$ stationary phase, both having flow rates through the column at about 1.0 mL/min. Approximately 1-25 µm of SRM 869a was injected into the mobile phase through an injector port. The separation was conducted between 10° C. and 70° C. for the fluorinated $C_{18}$ stationary phase and between 10° C. and 70° C. for the fluorinated carboxylic acid aminopropyl-linked phase. As the SRM 869a in the mobile phase flowed through the stationary phases, the SRM 869a constituents in the mobile phase solution migrated through the column at varying rates. The results are shown in FIGS. 8A and 8B wherein the detector response of the constituents of the SRM 869a are plotted versus time in minutes for the different temperatures.

As shown in FIG. 8A, the polymeric $C_{18}$ alkyl ligand phase of the prior art was shape selective at reduced temperatures, 10° C., this may be due to increased alkyl chain ligand order. As the temperature is increased to 45° C., molecular disorder within the alkyl chains may be increased, resulting in a decrease of shape recognition characteristics. Thus, at a temperature of 10° C. the hydrocarbon phase of the prior art was shape selective ($\alpha_{TBN/BaP} < 1$), at 45° C. it behaved as an intermediate phase ($\alpha_{TBN/BaP} \sim 1$), and at 70° C. there was no evidence of shape selectivity ($\alpha_{TBN/BaP} > 1.7$), as is shown in FIG. 8A. In contrast, the immobilized perfluorinated carboxylic acid phase of an aspect of the present invention shows decreased retention with increasing temperature, however the shape selectivity remained substantially consistent up to a temperature of 70° C. This retention of shape selectivity at higher temperatures was an unexpected result. Such an enhancement in shape recognition capabilities as shown in this aspect of the invention may be used for faster and more efficient separations at higher temperatures without compromising selectivity. The decreased separation time may also allow for increased sample throughput, decreased solvent usage, and a potential for use as preparative scale separations as well as analytical scale separations.

Example 4

The effect of fluorination of a carboxylic acid aminopropyl-linked stationary phases was tested in a liquid chromatograph. Two separate chromatograms of SRM 869a were generated to show the shape selectivity of the fluorinated carboxylic acid aminopropyl-linked phase of an embodiment of the present invention as compared to the shape selectivity of the hydrocarbon analog (i.e., octadecanoic acid aminopropyl-linked modified silica) stationary phase. The mobile phase comprised 60/40 (v/v) MeOH/H$_2$O for the fluorinated carboxylic acid aminopropyl-linked stationary phase and was 85/15 (v/v) MeOH/H$_2$O for the octadecanoic acid aminopropyl-linked modified silica stationary phase. The separation was conducted at about 25° C. and at flow rate of about 1.0 mL/min for both stationary phases. As the SRM 869a in the mobile phase flowed through the stationary phases, the SRM 869a constituents in the mobile phase solution migrated through the column at varying rates. The results are shown in FIGS. 9A and 9B wherein the detector response of the constituents of the SRM 869a are plotted versus time in minutes for the different stationary phases.

As shown in FIG. 9A, chromatograms of SRM 869a had a relatively low shape selectivity for the hydrocarbon analog, octadecanoic acid aminopropyl-linked modified silica, stationary phase ($\alpha_{TBN/BaP}$>1.7) while an aspect of the present invention having a fluorinated carboxylic acid aminopropyl-linked stationary phase, under less aqueous mobile phase conditions, exhibited high shape selectivity ($\alpha_{TBN/BaP}$<1). The mobile phase composition is different for the two separations as the solutes are infinitely retained on the hydrocarbon phase at 60/40 methanol/water and essentially unretained on the fluorinated phase at 85/15 methanol/water. Optimum mobile phase conditions for each phase are shown and the separation temperature was about 25° C. for both phases. The immobilized perfluorinated carboxylic acid phase demonstrated high shape selectivity whereas the immobilized hydrocarbon carboxylic acid phase is not, indicating that the fluorocarbon ligands may be responsible for the shape selective nature of the invented phase.

The invention claimed is:

1. A process for making a stationary phase for a reversed phase liquid chromatograph comprising:
    mixing a substrate material or fluorinated carboxylic acid with a reactive alkylsilane linker and at least one organic solvent to form a first solution;
    adding the other of said substrate material or said fluorinated carboxylic acid to said first solution or separated product therefrom to form a second solution; and
    reacting said second solution forming said stationary phase, said stationary phase comprising a shape selectivity characteristic with an $\alpha_{TBN/BaP}$ less than 1 within the entire temperature range of at least 10° C.-70° C.

2. The process of claim 1 wherein said mixing step is comprised of mixing said substrate material with said reactive alkylsilane linker and said at least one organic solvent, said mixing step being followed by a step of separating a functionalized substrate from said first solution, said separated product from said first solution being said functionalized substrate, said adding step comprising adding said fluorinated carboxylic acid to said functionalized substrate forming said second solution.

3. The process of claim 1 wherein said mixing step is comprised of mixing said fluorinated carboxylic acid with said reactive alkylsilane linker and said at least one organic solvent, said adding step comprising adding said substrate material to said first solution forming said second solution.

4. The process of claim 1 wherein said second solution is heated to at least 25° C.

5. The process of claim 1 wherein said substrate material has at least one synthetic organic polymer or a constituent selected from the group consisting of comprised of silica, alumina, titania, zirconia, hafnia, and combinations thereof.

6. The process of claim 1 wherein said substrate material has silica.

7. The process of claim 1 wherein said reactive alkylsilane linker has at least one constituent selected from the group consisting of comprised of 3-aminopropyltriethoxysilane, 3-aminopropylmethyldiethoxysilane, 3-aminopropyldimethylethoxysilane, 3-aminopropyltrimethoxysilane, 3-aminopropylmethyldimethoxysilane, 3-aminopropyldimethylmethoxysilane, 3-aminopropyltrichlorsilane, 3-aminopropylmethyldichlorsilane, 3-aminopropyldimethylchloroxysilane, 4-aminobutyltriethoxysilane, 4-aminobutylmethyldiethoxysilane, 4-aminobutyldimethylethoxysilane, 4-aminobutyltrimethoxysilane, 4-aminobutylmethyldimethoxysilane, 4-aminobutyldimethylmethoxysilane, 4-aminobutyltrichlorsilane, 4-aminobutylmethyldichlorsilane, 4-aminobutyldimethylchloroxysilane, glycidoxy-t-butyldimethylsilane, (3-glycidoxypropyl)bis(trimethylsiloxy)-methylsilane, (3-glycidoxypropyl)dimethylethoxysilane, (3-glycidoxypropyl)methyldiethoxysilane, (3-glycidoxypropyl)methyldimethoxysilane, (3-glycidoxypropyl)triethoxysilane, (3-glycidoxypropyl)trimethoxysilane, other amino- or epoxide-terminated reactive silanes, and combinations thereof.

8. The process of claim 1 further comprising a step of adding at least one catalyst to form said first or said second solution.

9. The process of claim 8 wherein said at least one catalyst has a catalyst selected from the group consisting of diisopropylcarbodiimide, dicyclohexylcarbodiimide, ethyl(dimethylaminopropyl)carbodiimide or other relevant alkylcarbodiimides, N-hydroxybenzotriazole or N-hydroxysuccinimide.

10. The process of claim 1 wherein said stationary phase has fluorinated carboxylic acid covalently bonded to said substrate material.

11. The process of claim 10 wherein said fluorinated carboxylic acid is covalently bonded to said substrate material through an amide or ester bond.

12. The process of claim 10 wherein said stationary phase comprises an alkylsilane-modified base substrate material.

13. The process of claim 1 wherein said fluorinated carboxylic acid has at least 7 perfluorinated carbon atoms.

14. The process of claim 1 wherein said fluorinated carboxylic acid has about 17 perfluorinated carbon atoms.

15. The process of claim 1 wherein said stationary phase has shape selectivity characteristics exhibited with an $\alpha_{TBN/BaP}$ of less than 1 with a mobile phase having at least 30% water.

16. A process for making a stationary phase for a reversed phase liquid chromatograph comprising:
    mixing a substrate material or fluorinated carboxylic acid with a reactive alkylsilane linker and at least one organic solvent to form a first solution;
    adding the other of said substrate material or said fluorinated carboxylic acid to said first solution or separated product therefrom to form a second solution; and
    reacting said second solution forming said stationary phase, said stationary phase comprising shape selectivity characteristics exhibited with an $\alpha_{TBN/BaP}$ of less than 1 within the entire temperature range of at least 10° C.-70° C. with a mobile phase having at least 30% water.

17. The process of claim 16 wherein said mixing step is comprised of mixing said substrate material with said reactive alkylsilane linker and said at least one organic solvent, said mixing step being followed by a step of separating a functionalized substrate from said first solution, said separated product from said first solution being said functionalized substrate, said adding step comprising adding said fluorinated carboxylic acid to said functionalized substrate forming said second solution.

18. The process of claim 16 wherein said mixing step is comprised of mixing said fluorinated carboxylic acid with said reactive alkylsilane linker and said at least one organic solvent, said adding step comprising adding said substrate material to said first solution forming said second solution.

19. The process of claim 16 wherein said stationary phase has fluorinated carboxylic acid covalently bonded to said substrate material.

* * * * *

UNITED STATES PATENT AND TRADEMARK OFFICE
CERTIFICATE OF CORRECTION

PATENT NO. : 7,794,837 B2
APPLICATION NO. : 12/186728
DATED : September 14, 2010
INVENTOR(S) : Katrice A. Lippa, Catherine A. Rimmer and Lane C. Sander It is certified that error appears in the above-identified patent and that said Letters Patent is hereby corrected as shown below:

Col. 15, Line No. 64, Claim 5, "selected from the group consisting of comprised of silica," should read --selected from the group consisting of silica,--

Col. 16, Line No. 3, Claim 7, "consisting of comprised of 3-aminopropyltriethoxysilane," should read --consisting of 3-aminopropyltriethoxysilane,--

Signed and Sealed this

Second Day of November, 2010

David J. Kappos
*Director of the United States Patent and Trademark Office*